(12) United States Patent
Minagawa et al.

(10) Patent No.: US 7,620,495 B2
(45) Date of Patent: Nov. 17, 2009

(54) ON-VEHICLE INFORMATION TERMINAL, METHOD FOR CONTROLLING ON-VEHICLE INFORMATION TERMINAL AND PROGRAM PRODUCT

(75) Inventors: Hiroshi Minagawa, Zama (JP); Junko Oguchi, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 440 days.

(21) Appl. No.: 11/514,086

(22) Filed: Sep. 1, 2006

(65) Prior Publication Data

US 2007/0052546 A1    Mar. 8, 2007

(30) Foreign Application Priority Data

Sep. 5, 2005    (JP)    ............................. 2005-256065

(51) Int. Cl.
*G01C 21/30*    (2006.01)

(52) U.S. Cl. .................... 701/211; 340/815.4; 345/156

(58) Field of Classification Search ................ 701/211; 340/815.4; 345/156
See application file for complete search history.

(56) References Cited

U.S. PATENT DOCUMENTS

| | | | | | |
|---|---|---|---|---|---|
| 5,764,139 | A | * | 6/1998 | Nojima et al. | 340/461 |
| 6,006,161 | A | * | 12/1999 | Katou | 701/212 |
| 6,202,139 | B1 | * | 3/2001 | Witt et al. | 711/169 |
| 6,788,026 | B2 | * | 9/2004 | Muramatsu | 320/107 |
| 6,892,135 | B1 | * | 5/2005 | Krull et al. | 701/211 |
| 7,103,368 | B2 | * | 9/2006 | Teshima | 455/456.3 |
| 2005/0267676 | A1 | * | 12/2005 | Nezu et al. | 701/200 |

FOREIGN PATENT DOCUMENTS

JP    2002-267469    9/2002

* cited by examiner

*Primary Examiner*—Mark Hellner
(74) *Attorney, Agent, or Firm*—Crowell & Moring LLP

(57) ABSTRACT

An on-vehicle information terminal comprises a display control unit that displays a first screen at a display monitor and switches from the first screen to a second screen when a predetermined length of display change-over time elapses after the first screen starts to be displayed and a time control unit that adjusts the length of display change-over time based upon at least one of the volume of information contained in the first screen and a screen selection record indicating past selections of the first screen or the second screen by the user.

12 Claims, 10 Drawing Sheets

SCREEN PRIOR TO VICS INFORMATION INTERRUPT DISPLAY

VICS INFORMATION INTERRUPT DISPLAY

US 7,620,495 B2

ON-VEHICLE INFORMATION TERMINAL, METHOD FOR CONTROLLING ON-VEHICLE INFORMATION TERMINAL AND PROGRAM PRODUCT

The disclosure of the following priority application is herein incorporated by reference:
Japanese Patent Application No. 2005-256065 filed Sep. 5, 2005

BACKGROUND OF THE INVENTION

1. Field of the Invention

The present invention relates to an on-vehicle information terminal that provides the user with various types of information by bringing up the information on the screen display.

2. Description of Related Art

There are on-vehicle information terminals that provide users with various types, of information such as a roadmap and traffic information by bringing up the information on a screen display. In those, there are on-vehicle information terminals known in the related art that adjust the screen display change-over timing as appropriate to the current traveling conditions. For instance, Japanese Laid-Open Patent Publication No. 2002-267469 discloses a navigation system that brings up an interrupt display of traffic information (VICS information) obtained via the Vehicle Information and Communication System (VICS). In this navigation system, the length of the interrupt display time is adjusted in correspondence to the type of road on which the vehicle is currently traveling or the current traveling conditions, e.g., whether or not the vehicle is being guided on a recommended route. However, the on-vehicle information terminals in the related art do not allow adjustment of the screen display change-over timing by taking into consideration the length of time required by the user to fully grasp the display contents.

SUMMARY OF THE INVENTION

According to the first aspect of the present invention, the on-vehicle information terminal comprises a display control unit that displays a first screen at a display monitor and switches from the first screen to a second screen when a predetermined length of display change-over time elapses after the first screen starts to be displayed and a time control unit that adjusts the length of the display change-over time based upon at least one of a volume of information contained in the first screen and a screen selection record indicating past selections of the first screen or the second screen by the user.

According to the second aspect of the present invention, in the on-vehicle information terminal according to the first aspect, it is desirable that the volume of information is the number of characters contained in the first screen.

According to the third aspect of the present invention, in the on-vehicle information terminal according to the second aspect, the on-vehicle information terminal may further include a reception unit that receives road traffic information transmitted from an external source. It is desirable that in this on-vehicle information terminal according to the third aspect, the display control unit displays as the first screen a screen containing a text image presenting the contents of the road traffic information received by the reception unit and the time control unit adjusts the length of display time based upon the number of characters in the text image contained in the first screen.

According to the fourth aspect of the present invention, in the on-vehicle information terminal according to the first aspect, the volume of information may be the volume of traffic jam information contained in the first screen.

According to the fifth aspect of the present invention, in the on-vehicle information terminal according to the fourth aspect, the on-vehicle information terminal may further include a reception unit that receives road traffic information transmitted from an external source. It is desirable that in this on-vehicle information terminal according to the fifth aspect, the display control unit displays as the first screen a screen containing a simplified graphic image presenting the contents of the road traffic information received by the reception unit and the time control unit adjusts the length of display time based upon the number of congested areas in the simplified graphic image contained in the first screen.

According to the sixth aspect of the present invention, in the on-vehicle information terminal according to the first aspect, the on-vehicle information terminal may further include an operation unit that allows the user to select either the first screen or the second screen and a display selection unit that displays at the display monitor either the first screen or the second screen selected by the user via the operation unit irrespective of the display change-over timing. It is desirable that in this on-vehicle information terminal according to the sixth aspect, the time control unit adjusts the length of display change-over time based upon the screen selection record indicating past screen selections by the user effected via the operation unit.

According to the seventh aspect of the present invention, in the on-vehicle information terminal according to the first aspect, it is desirable that the time control unit reduces the length of display change-over time if the screen selection record indicates that the user previously selected the second screen while the first screen was up on display at the display monitor.

According to the eighth aspect of the present invention, in the on-vehicle information terminal according to the first aspect, it is desirable that the time control unit increases the length of display change-over time if the screen selection record indicates that the user previously selected the first screen while the second screen was up on display at the display monitor.

According to the ninth aspect of the present invention, the method for controlling an on-vehicle information terminal comprises displaying a first screen at a display monitor, setting a length of display change-over time based upon at least one of a volume of information contained in the first screen and a screen selection record indicating past selections of the first screen or a second screen by the user and switching over from the first screen to the second screen when the length of display change-over time having been set elapses after the first screen starts to be displayed.

According to the tenth aspect of the present invention, in the on-vehicle information terminal control method according to the ninth aspect, it is desirable that the on-vehicle information terminal control method further comprises allowing a user to select either the first screen or the second screen, displaying at the display monitor either the first screen or the second screen selected by the user irrespective of the display change-over time and adjusting the length of display change-over time having been set based upon the record indicating past selections of the first screen or the second screen by the user.

According to the eleventh aspect of the present invention, the program product to be executed by a computer in an on-vehicle information terminal enables the computer to execute a processing step for displaying a first screen at a display monitor, a processing step for setting a length of display change-over time based upon at least one of a volume of information contained in the first screen and a screen selection record indicating past selections of the first screen or the second screen by the user and a processing step for switching over the first screen to the second screen when the length of display change-over time having been set elapses after the first screen starts to be displayed.

According to the twelfth aspect of the present invention, in the program product according to the eleventh aspect, it is desirable that the program product further enables the computer to execute a processing step for allowing the user to select either the first screen or the second screen, a processing step for displaying at the display monitor either the first screen or the second screen selected by the user regardless of display change-over time and a processing step for adjusting the length of display change-over time having been set based upon the record indicating past selections of the first screen or the second screen by the user.

DETAILED DESCRIPTION OF PREFERRED EMBODIMENTS

First Embodiment

Figure 1:
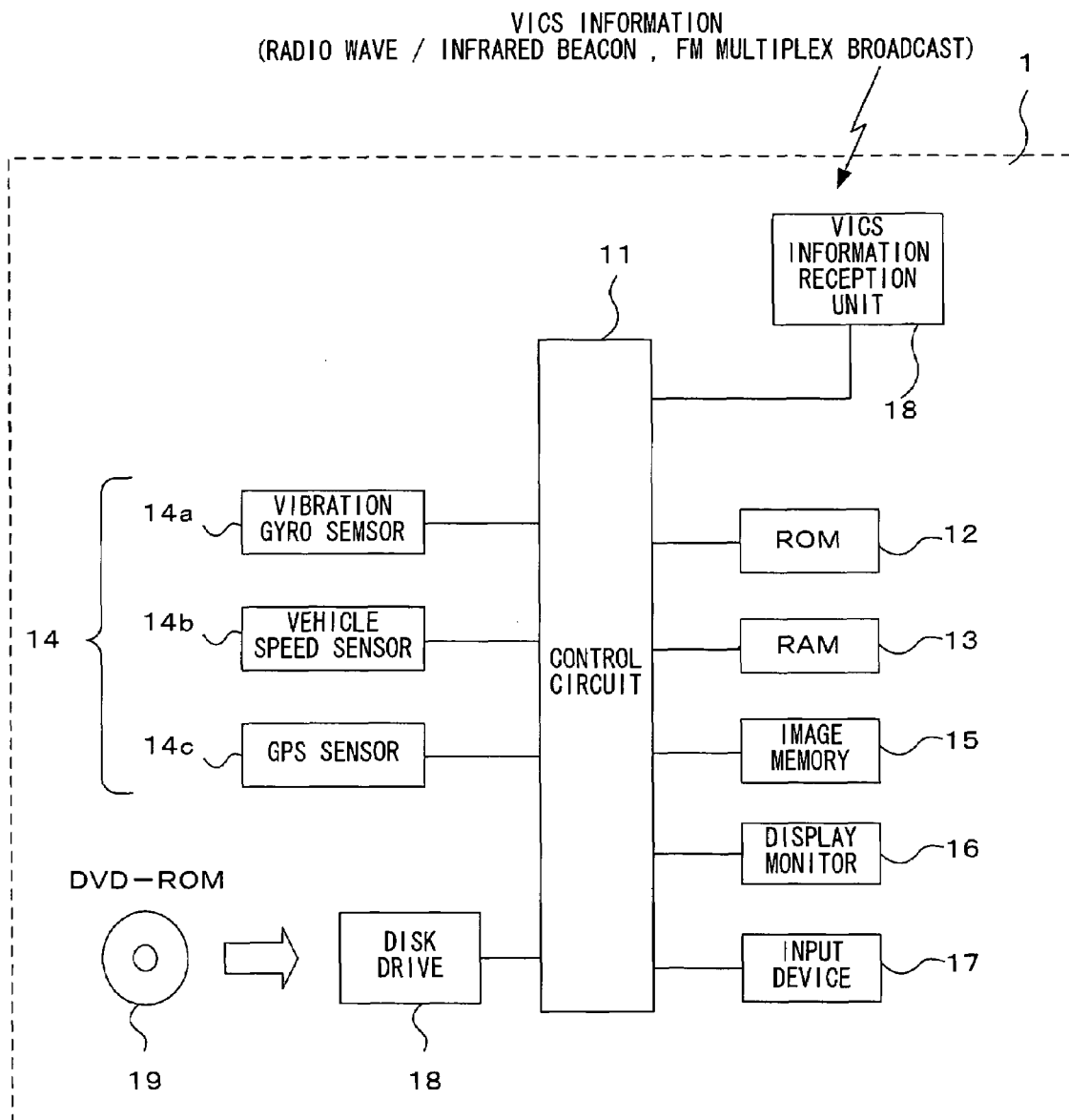
FIG. 1 is a block diagram showing the structure of the navigation system according to a first embodiment of the present invention.

The first embodiment of the present invention will be explained in the followings. The navigation system achieved in the embodiment adopts the structure shown in FIG. 1. The navigation system, installed in a vehicle, guides the subject vehicle to a destination by searching for a recommended route and displaying a roadmap. It also receives various types of road traffic information (VICS information) such as traffic jam information transmitted from a VICS center and displays the received VICS information on the roadmap. The navigation system 1 in FIG. 1 includes a control circuit 11, a ROM 12, a RAM 13, a current position detection device 14, an image memory 15, a display monitor 16, an input device 17, a VICS information reception unit 18 and a disk drive 19. A DVD-ROM 20 having recorded therein map data is loaded into the disk drive 19.

The control circuit 11 constituted with a microprocessor and its peripheral circuits uses the RAM 13 as its work area when executing a control program stored in the ROM 12 to implement various types of processing and control to be detailed later. The current position detection device 14, which detects the current position of the subject vehicle, may comprise various types of sensors, for instance, a vibration gyro 14a that detects the advancing direction of the subject vehicle, a vehicle speed sensor 14b that detects the vehicle speed, a GPS sensor 14c that detects a GPS signal transmitted from a GPS satellite and the like. Based upon the current position of the subject vehicle detected by the current position detection device 14, the navigation system 1 determines a route search start point to be detailed later, and displays the current position of the subject vehicle on the roadmap.

In the image memory 15, image data to be displayed at the display monitor 16 are temporarily stored. The image data include road map drawing data and various types of graphic data, which are generated in the control circuit 11 based upon the map data recorded in the DVD-ROM 19 and the VICS information received by the VICS information reception unit 18 to be explained later. The roadmap is displayed at the display monitor 16 and various types of road traffic information are displayed on the roadmap by outputting the image data generated by the control circuit 11 to the image memory 15.

The input device 17 includes various input switches for the user to perform setting of the destination and waypoints (hereafter simply and collectively referred to as a destination) and the like. The input device 17 may be constituted as an operation panel or a remote-control unit.

By operating the input device 17 as prompted by screen instructions displayed at the display monitor 16, the user is able to set a destination by specifying its geographical name, its position on the map or the like.

The VICS information reception unit 18 receives VICS information transmitted from a VICS information center to the navigation system 1. Various types of road traffic information such as traffic jam information, traffic control information and parking information are transmitted as the VICS information to the navigation system 1. The VICS information received by the VICS information reception unit 18 is output to the control circuit 11 where image data to be used to display the contents of the VICS information as an image on the roadmap are created as explained earlier. The contents of the received VICS information are thus displayed as an image at the display monitor 16.

The VICS information is transmitted from the VICS information center to the navigation system 1 via radio wave beacons primarily installed on express highways, infrared beacons primarily installed on regular roads or FM multiplex broadcast. Each radio wave beacon and infrared beacon transmits VICS information to vehicles passing through a limited area, i.e., the area around the installation point, via radio waves or light (infrared light). The VICS information can be transmitted to a relatively wide area through FM multiplex broadcasting.

The disk drive 19 reads out map data to be used to display the roadmap from the DVD-ROM 20 loaded therein. These map data include route calculation data used to search for a route, route guidance data used to guide the subject vehicle to the destination along the recommended route, such as the names of intersections and roads, and road data indicating roads. In addition, the map data include background data indicating map features other than roads, such as rivers, railways and various types of facilities (landmarks) on the map. It is to be noted that the road data include road classification data indicating the road classifications (road-types) of individual roads. The road classification of a given road may indicate that the particular road is an express highway, a national road or a prefectural road.

The smallest unit that represents a road section in the road data is referred to as a link, and each road is constituted with a plurality of links. The point at which two or more links connect is referred to as a node, and each node holds positional information (coordinate information). Based upon the positional information corresponding to the individual nodes, the shapes of links, i.e., the shape of each road, are determined. It is to be noted that while the map data are stored in a DVD-ROM in the example described above, the map data may be read out from another type of recording medium such as a CD-ROM or a hard disk.

Once the user sets the destination by operating the input device 17, the navigation system 1 determines through an arithmetic operation the route to the destination by setting the current position detected by the current position detection device 14 as a route search start point and using a specific algorithm based upon the route calculation data. The recommended route thus determined is displayed on the roadmap by altering its display mode, e.g., by using a different display color, so as to ensure that it can easily be distinguished from the other roads. As a result, the user is able to check the route on the roadmap displayed at the display monitor 16. In addition, the navigation system 1 guides the subject vehicle along the route by providing visual or audio instructions for the user along the advancing direction. The route guidance to the destination is thus provided by guiding the subject vehicle to the destination along the recommended route in the roadmap on display.

During the route guidance described above, a subject vehicle position mark is displayed on the roadmap to indicate the subject vehicle position. As the subject vehicle travels on with the subject vehicle mark on the roadmap moving accordingly, the user is able to ascertain exactly where the subject vehicle is currently traveling. The subject vehicle position is detected by the current position detection device 14, as explained earlier.

Upon receiving VICS information by the VICS information reception unit 18, the navigation system 1 displays the contents of the VICS information as an image at the display monitor 16. For instance, a congested section of a road may be indicated in orange or red depending upon the degree of congestion or a traffic-controlled area may be indicated with a specific mark. In addition, the contents of parking lot information may be displayed by displaying color-coded parking lot marks, each indicating a specific level of availability of parking space, which are displayed at positions where individual parking lots are located on the roadmap. The various types of road traffic information are thus provided on the roadmap by using different display marks.

It is to be noted that the VICS information transmitted from the VICS center is provided at three different levels, level 1 through level 3, and a specific display mode is assumed in correspondence to the level of the VICS information. At level 1, the contents of the VICS information are provided as text. For instance, text messages indicating the name of a congested area, the distance over which the traffic jam ranges, the expected traveling time between specific geographic points and the like may be displayed as level 1 VICS information. The VICS information at level 2 is provided by using simplified graphics (the shapes of roads are indicated with simplified graphics). For instance, an image indicating a congested area on a specific road in red, orange or the like over the simplified graphic may be displayed as level 2 VICS information. VICS information at level 3 is provided in conjunction with a roadmap. Namely, level 3 VICS information is provided by indicating congested areas and traffic-controlled areas and displaying parking lot marks and the like on the roadmap as explained earlier.

While the VICS information is provided at three different levels as described above, level 1 VICS information or level 2 VICS information is provided in an interrupt display on the screen over a predetermined length of time upon reception. Namely, as level 1 VICS information or level 2 VICS information is received while the roadmap is on display, the text image (level 1) or the simplified graphic image (level 2) corresponding to the VICS information is superimposed over the roadmap on display. When the predetermined length of display time elapses after the VICS information is brought up in the interrupt display, the text image or the simplified graphic image displayed over the roadmap is cleared and thus the display is switched back to the initial roadmap screen.

Figure 2A:
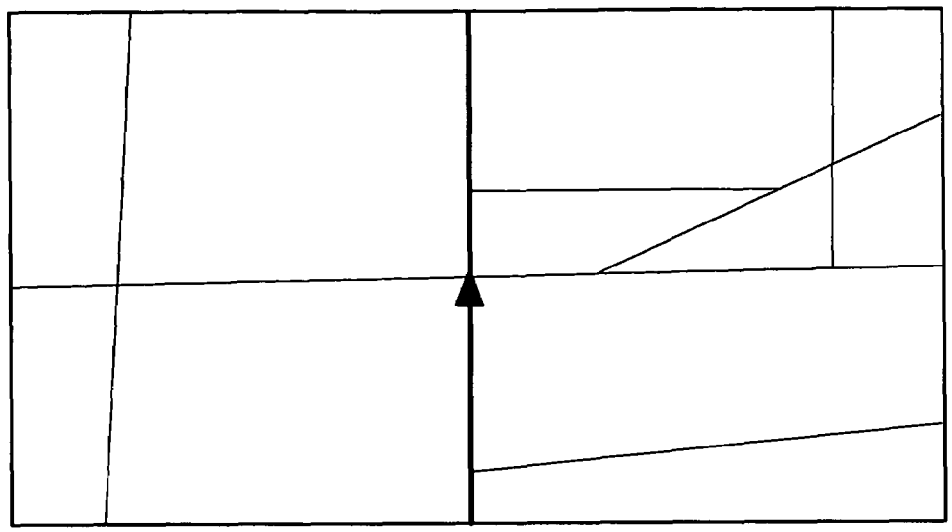
FIG. 2 presents examples of display screens that may be shown at the display monitor in the event of an interrupt display of a simplified graphic image generated based upon VICS information.
Figure 2B:
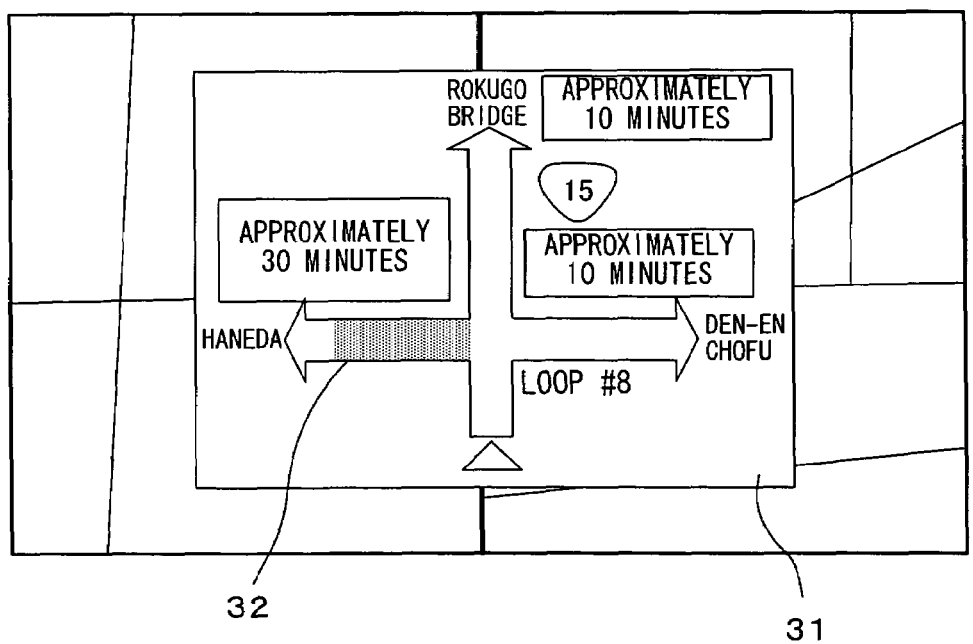

FIG. 2A presents an example of a roadmap screen or a roadmap picture that may be up on display at the display monitor 16 prior to a VICS information reception. As level 2 VICS information is received, the current display is interrupted to bring up the simplified graphic image corresponding to the VICS information, as shown in FIG. 2B. In this screen or picture, the simplified graphic image indicated by reference numeral 31 is superimposed over the roadmap. In the simplified graphic image 31, the geographical names of various target points present in different directions along which the vehicle may advance from the current position, the lengths of time required to travel to individual target points, the road names, route numbers and the like are indicated. It is to be noted that a shaded area 32 in the simplified graphic indicates that the road heading toward the direction indicated by the corresponding arrow is congested.

When the predetermined length of display time elapses after the display is switched to the screen shown in FIG. 2B, the display is switched back to the screen in FIG. 2A. It is to be noted that while an explanation is given on an example in which an interrupt display of a simplified graphic image is brought up based upon level 2 VICS information, an interrupt display of a text image corresponding to level 1 VICS information is also brought up in a similar manner.

When bringing up an interrupt display of a text image corresponding to level 1 VICS information or a simplified graphic image corresponding to level 2 VICS information, as described above, the navigation system 1 adjusts the length of display time in correspondence to the volume of information contained in the image. Specifically, it increases the length of interrupt display time if the information volume is significant, whereas it reduces the length of interrupt display time if the information volume is small. Thus, the length of VICS information interrupt display time is adjusted so as to ensure that the information stays on display long enough for the user to thoroughly grasp its meaning.

Figure 3:
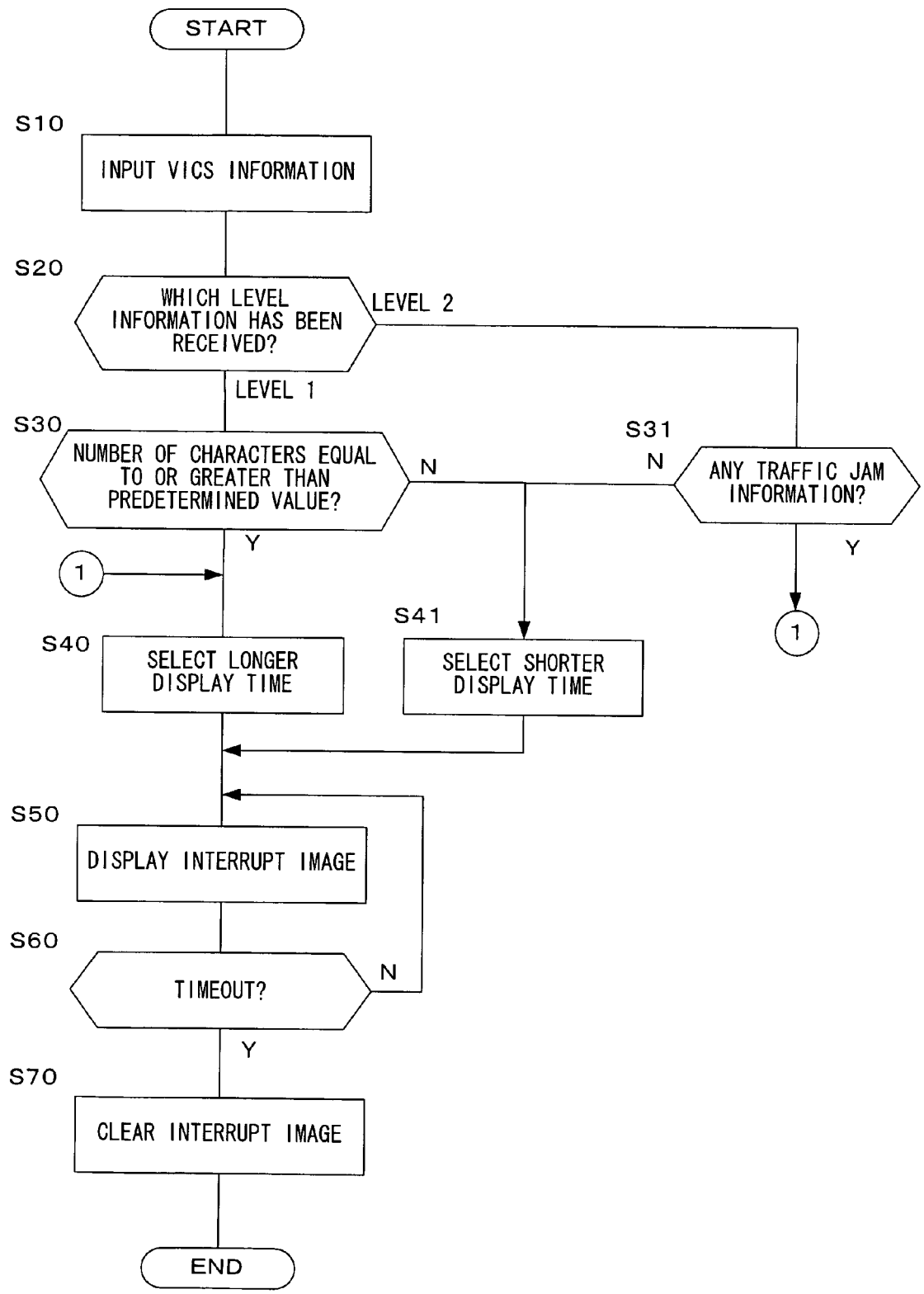
FIG. 3 presents a flowchart of the VICS information interrupt display processing.

FIG. 3 presents a flowchart of the VICS information interrupt display processing executed in the embodiment. The processing in the flowchart is executed by the control circuit 11 when level 1 or level 2 VICS information has been received at the VICS information reception unit 18. It is to be noted that if level 3 VICS information has been received, processing for displaying traffic jam information and the like in combination with the roadmap as described earlier is executed instead of the processing in the flowchart presented in FIG. 3.

In step S10, the VICS information having been received at the VICS information reception unit 18 is input at the control circuit 11. In step S20, a decision is made as to whether level 1 VICS information or level 2 VICS information as been received based upon the VICS information having been input in step S10. If level 1 VICS information has been received, the operation proceeds to step S30, whereas the operation proceeds to step S31 if level 2 VICS information has been received.

If the operation proceeds from step S20 to step S30, a decision is made in step S30 as to whether or not the number of characters contained in level 1 VICS information having been received, i.e., the number of characters in the text image to be brought up in the interrupt display, is equal to or greater than a predetermined specific threshold value. If it is decided that the number of characters is equal to or greater than the predetermined threshold value, e.g., 20 characters, the operation proceeds to step S40. The operation, however, proceeds to step S41 if the number of characters is smaller than the threshold value.

If, on the other hand, the operation proceeds from step S20 to step S31, a decision is made in step S31 as to whether or not level 2 VICS information having been received, i.e., the simplified graphic image to be brought up in the interrupt display, contains any traffic jam-information. If it is decided that level 2 VICS information includes traffic jam information, the operation proceeds to step S40, whereas if it is decided that it does not contain any traffic jam information, the operation proceeds to step S41. It is to be noted that if it is decided that the traffic jam information is included in level 2 VICS information, the occurrence of a traffic jam is indicated in the simplified graphic image provided based upon the VICS information by indicating the corresponding affected area as a shaded portion indicated by reference numeral 32 in FIG. 2B on the simplified graphic.

In step S40 or step S41, the length of display time for the interrupt display is set. A significant length of display time, e.g., 5 sec, is set in step S40, whereas a smaller length of display time, e.g., 3 sec, is set in step S41. Depending upon the results of the decision made in step S30 or step S31, either of the two different lengths of display time is set. Once step S40 or step S41 is executed, the operation proceeds to step S50.

In step S50, an interrupt image corresponding to the VICS information having been received, i.e., the text image prepared based upon level 1 VICS information or the simplified graphic image prepared based upon level 2 VICS information, is brought up on display at the display monitor 16. Thus, the display is switched from, for instance, the screen in FIG. 2A to the screen in FIG. 2B. In the next step S60, a decision is made as to whether or not the length of time set for the interrupt display has elapsed by comparing the length of time having elapsed after the interrupt image was brought up on display in step S50 with the length of display time having been set in step S40 or step S41. If the length of display time having been set has not elapsed, the operation returns to step S50 to continuously display the interrupt image. Once the length of display time elapses, the operation proceeds to step S70 to clear the interrupt image on display. As a result, the display is switched from, for instance, the screen in FIG. 2B to the screen in FIG. 2A. Once step S70 is executed, the processing in the flowchart presented in FIG. 3 ends.

The following advantages are achieved in the first embodiment explained above.

(1) A screen such as that shown in FIG. 2B is brought up on display at the display monitor 16 as an interrupt image prepared based upon the received VICS information (step S50). When the predetermined length of display time has elapsed after the screen starts to be displayed in step S50 (step S60), the interrupt image is cleared (step S70), thereby switching back to the screen shown in FIG. 2A. During this process, either a longer display time or a shorter display time is set based upon the volume of information in the interrupt image contained in the screen shown in FIG. 2B (step S40 or step S41), so as to adjust the length of display time. As a result, the screen display change-over time can be adjusted by ensuring that the information stays on display long enough for the user to thoroughly grasp its meaning.

(2) The volume of information in the interrupt image is measured by the number of characters therein and, based upon the number of characters, the length of interrupt image display time is adjusted. Namely, if level 1 VICS information has been received, the length of display time over which the VICS information is to be displayed is adjusted based upon the number of characters in the text image to be displayed as the interrupt image (step S30). As a result, when level 1 VICS information is received, optimal screen display change-over time can be set through simple processing.

(3) The volume of information in the interrupt image is measured by the volume of traffic jam information therein and, based upon the volume of traffic jam information, the length of interrupt image display time is adjusted. Namely, if level 2 VICS information has been received, the length of display time over which the VICS information is to be displayed is adjusted based upon the number of congested areas in the simplified graphic image to be displayed as the interrupt image (step S31). As a result, when level 2 VICS information is received, optimal screen display change-over time can be set through simple processing.

It is to be noted that either of the two different lengths of display time is set by executing step S40 or step S41, depending upon the results of the decision made in step S30 or S31 in the embodiment explained above. Alternatively, the length of display time may be selected from three or more different display time lengths. For instance, upon receiving level 1 VICS information, the length of display time may be set to 3 sec if the number of characters is smaller than 10, to 5 sec if the number of characters is equal to or greater than 10 but smaller than 20 characters and to 7 sec if the number of characters is equal to or greater than 20. In addition, upon receiving level 2 VICS information, the length of display time may be set to 3 sec if the VICS information does not contain any traffic jam information, to 5 sec if the VICS information indicates a single congested area and to 7 sec if there are two or more congested areas. Namely, in correspondence to the number of characters in the text image presenting the contents of level 1 VICS information or the number of congested areas in the simplified graphic image presenting the contents of level 2 VICS information, the length of time over which the interrupt image is to be displayed can be adjusted to an arbitrary value.

In the embodiment explained above, either the greater length of display time or the smaller length of display time is selected based upon the number of congested areas indicated in level 2 VICS information having been received. Alternatively, the length of display time may be selected based upon the level of congestion. Namely, a longer display time may be selected if the congestion level is high (backed up traffic) and a shorter display time may be selected if the congestion level is low (slow-moving traffic). Furthermore, the length of display time may be adjusted by factoring in both the number of congested areas and the congestion level in combination.

Second Embodiment

The second embodiment of the present invention is now explained. In the first embodiment described earlier, the length of interrupt display time over which VICS information is brought up in an interrupt display is adjusted. In the second embodiment, the display change-over timing with which an instruction screen brought up on display in a help mode for providing the user with guidance on menu item operation procedures is switched over is adjusted. Specific details of the embodiment are now explained.

Figure 4:
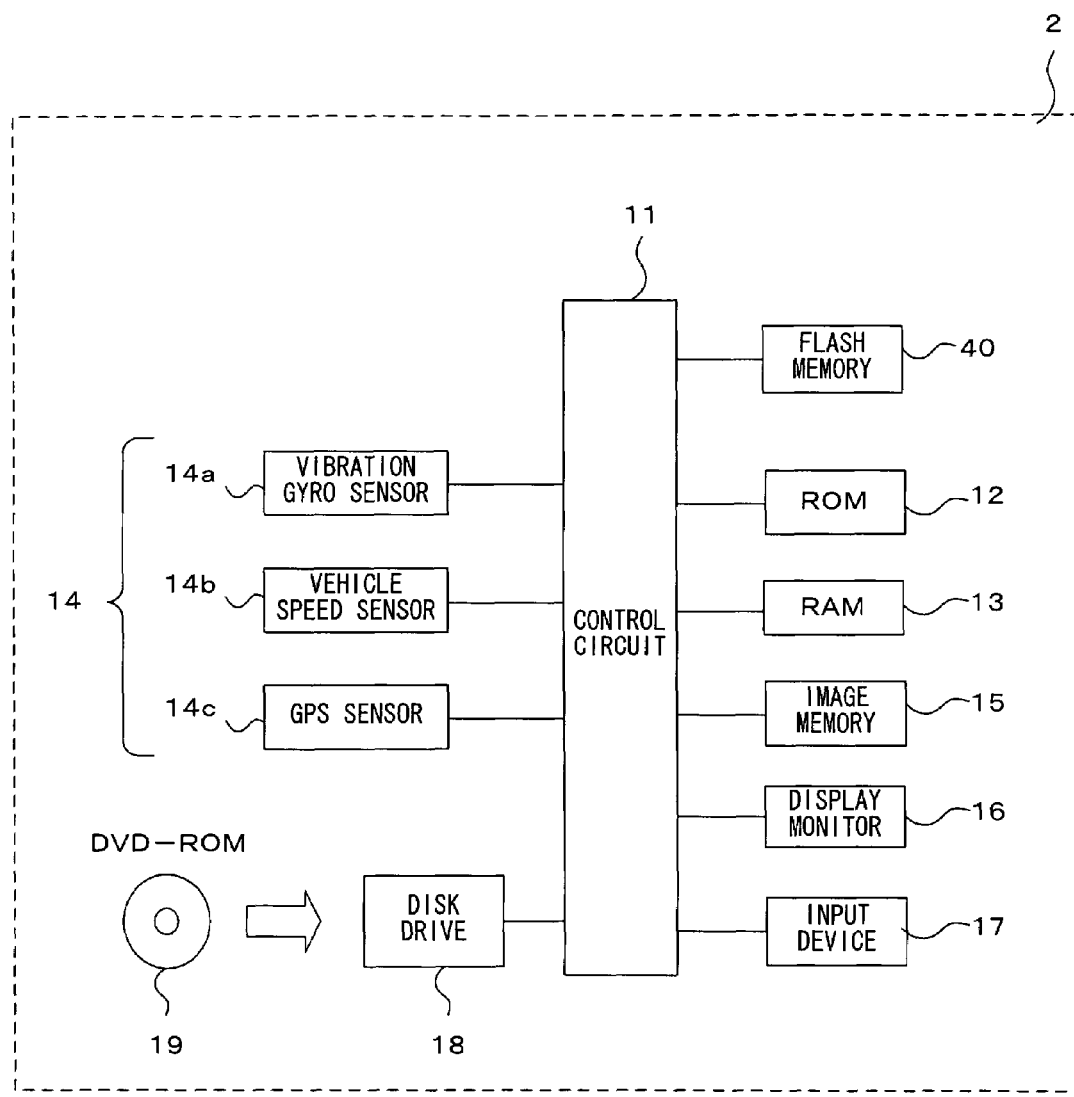
FIG. 4 is a block diagram showing the structure of the navigation system according to a second embodiment of the present invention.

A navigation system 2 achieved in the embodiment adopts the structure shown in FIG. 4 which is identical to that of the navigation system 1 in the first embodiment shown in FIG. 1, except that the navigation system 2 includes a flash memory 40 in place of the VICS information reception unit 18. The flash memory 40 is a nonvolatile memory capable of holding storage contents even when the power to the navigation system 2 is turned off. The flash memory 40 is used to store the length of display change-over time for each instruction screen as explained later.

When the user wishes to engage the navigation system 2 according to this embodiment in a specific type of processing, the user presses a menu button to call up the menu screen and, in response, the operation shifts into a menu selection mode. Subsequently, the user operates the input device 17 to select a menu item corresponding to the desired processing in the selection menu displayed in the menu screen. The navigation system 2 then executes the processing corresponding to the selected menu item.

Since the selection menu is organized over a plurality of hierarchical levels in correspondence to processing contents, the user needs to select a specific menu item in each hierarchical level. For instance, if he wishes to set a destination by entering the name of a destination facility, he needs to first select "destination" in the menu screen and then select "input name". In response, a character entry screen is brought up on display and, as the user enters the name of the destination facility in this screen, matching facilities are searched as destination candidates. A specific facility selected from these destination candidates is finally set as the destination.

It is to be noted that a help mode in which the desired processing can be executed even when the user does not know the operation procedure is available in the navigation system 2. In the help mode, as the user enters a keyword related to the target processing, the operation procedure that needs to be performed to select the processing is indicated. The following is an explanation of the details of the operation executed in the navigation system 2 in the help mode.

Figure 5:
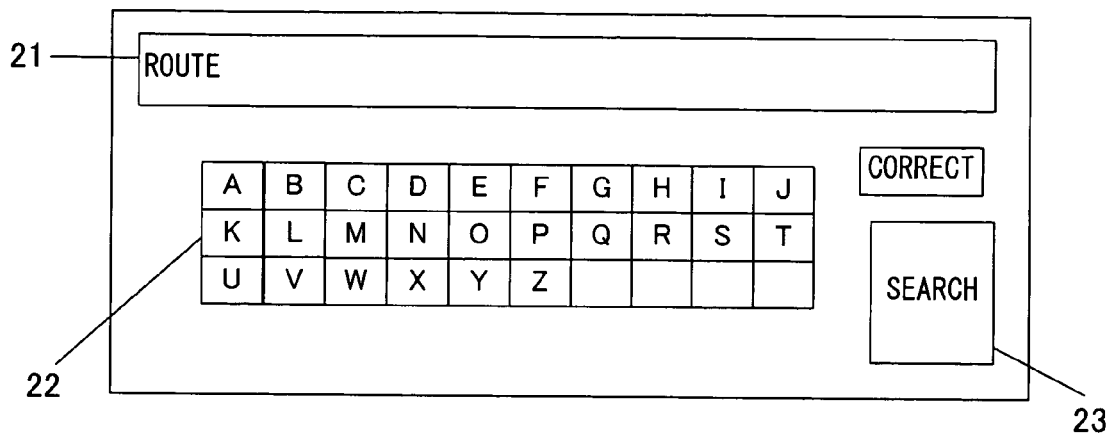
FIG. 5 presents an example of the keyword input screen.

FIG. 5 shows the keyword entry screen which is first brought up on display first in the help mode. As the user sequentially selects specific characters among those displayed in a keyboard panel 22 in the keyword entry screen by operating the input device 17, a keyword related to the contents of the processing to be searched is entered. The user, wishing to search for processing regarding routes, enters the keyword "route", for instance. The entered keyword is displayed in an input display field 21 for user verification.

As the user presses a search button 23 upon completing the keyword entry, menu items related to the entered keyword are searched from the various menu items in the selection menu. If "route" has been entered as the keyword as described above, menu items related to "route", e.g., menu items containing the word "route", are searched. The search results are displayed in a list in a search result screen such as that shown in FIG. 6.

Figure 6:
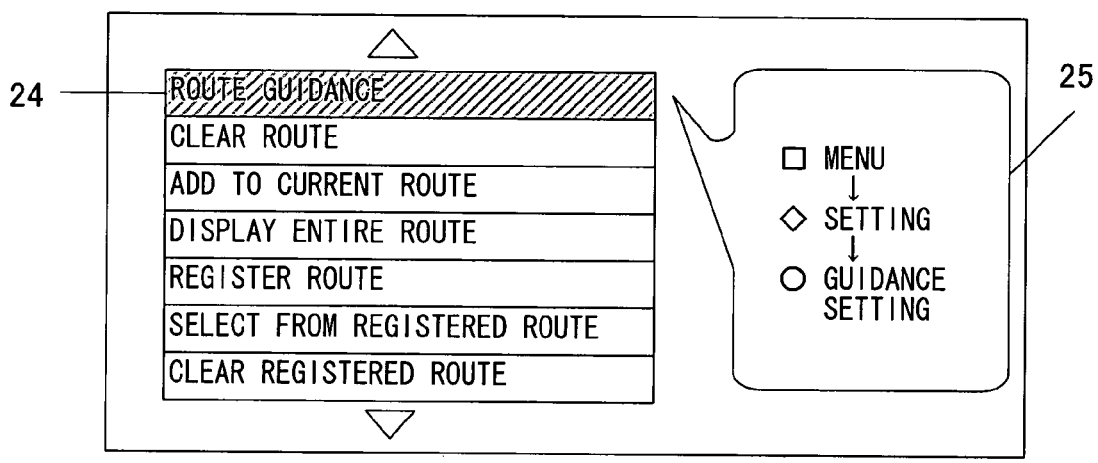
FIG. 6 presents an example of the search result screen.

In the search result screen in FIG. 6, one of the menu items in the list is highlighted and text information explaining the user operation procedure to be performed to select the particular menu item in the menu screen is provided. A highlight display can be switched from one menu item to another freely by the user via the input device 17. In the example presented in FIG. 6, a menu item "route guidance" indicated by reference numeral 24, among the various menu items in the list of menu items having been searched by using the word "route" as the search keyword, is highlighted. Inside a balloon display area 25, text information explaining the operation procedure to be performed to select the menu item "route guidance" is displayed. Namely, the search result screen in FIG. 6 indicates that the user is able to select "route guidance" by sequentially selecting "menu", "setting" and "guidance setting" in this order in the selection menu.

Figure 7:
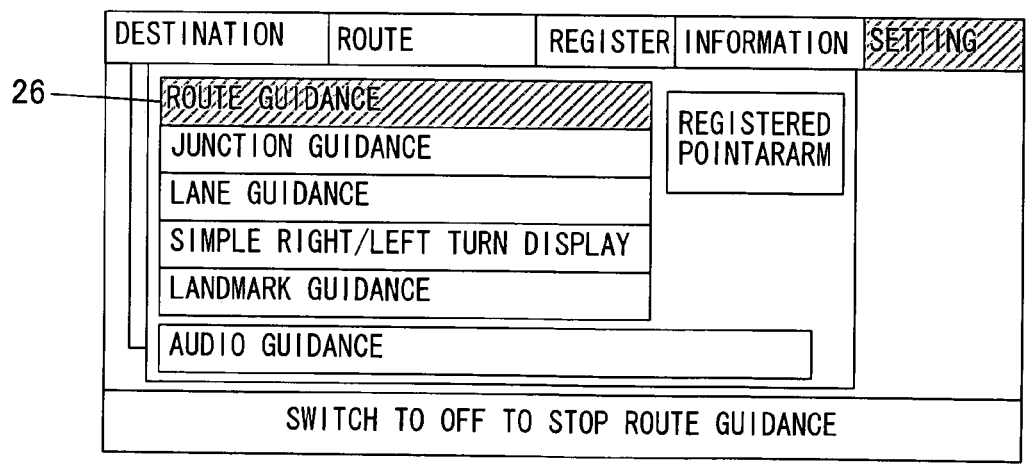
FIG. 7 presents an example of a screen that may be brought up on display after a menu item is selected in the search result screen.

As the user designates a specific menu item in the list in the search result screen in FIG. 6, the operation exits the help mode and the screen display jumps to a screen in which the particular menu item can be selected in the selection menu. For instance, if the user has designated the menu item "route guidance", a screen such as that shown in FIG. 7 maybe brought up on display. The user selects "route guidance" indicated by reference numeral 26 in the screen shown in FIG. 7 to engage the navigation system 1 in route guidance processing. It is to be noted that when the screen display jumps to the screen shown in FIG. 7, the instruction screens that indicate the contents of the operation screens displayed in correspondence to the various hierarchical levels in the selection menu are successively displayed in an order matching the operation procedure performed to select the menu item. This feature is to be explained in detail later.

It is to be noted that when the text information explaining the operation procedure is displayed in the search result screen in FIG. 6, the same information may also be provided as an audio output for the user to allow him to learn the operation procedure without having to view the screen. Alternatively, the operation procedure may be indicated through an audio output alone without displaying the text information.

Also, in the search result screen in FIG. 6, icons, each assigned as an inherent icon to one of the menu items in the selection menu may be displayed together with the explanation of the operation procedure, so as to allow the user to learn the operation procedure visually. For instance, a square icon, a diamond-shaped icon and a circular icon may be displayed next to "menu", "setting" and "guidance setting" respectively in the operation procedure explanation shown in FIG. 6. The same icons are also displayed in the selection menu in correspondence to the individual menu items. By displaying the icons each assigned to a specific menu item among the menu items that must be selected in the individual hierarchical levels in the selection menu until the menu item is ultimately selected as described above, the user is able to learn the operation procedure in correspondence to the icons. The term "icons" as referred to in this context are constituted with specific graphics, characters, symbols or the like, and their designs, each corresponding to a specific menu item, are different from one another.

Figure 8:
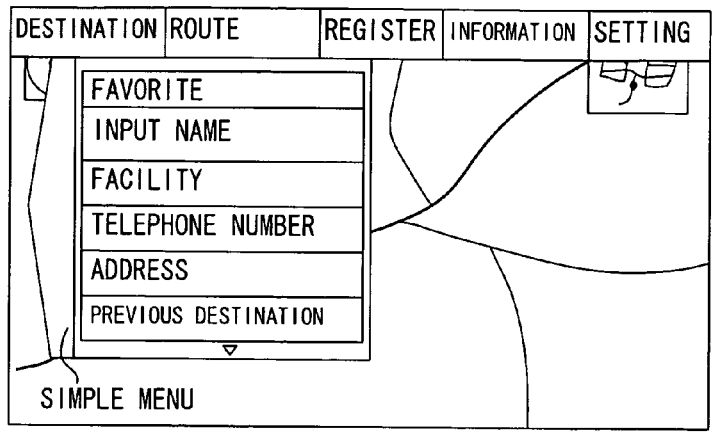
FIG. 8 presents an example of an instruction screen initially brought up on display when the display contents corresponding to various hierarchical layers in the selection menu are to be successively displayed in conformance to an operation sequence.
Figure 9:
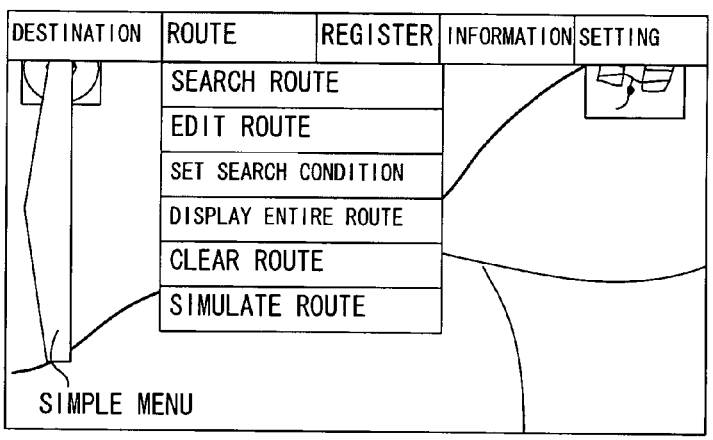
FIG. 9 presents a specific example of an instruction screen that may be brought up on display after the screen shown in FIG. 8.
Figure 10:
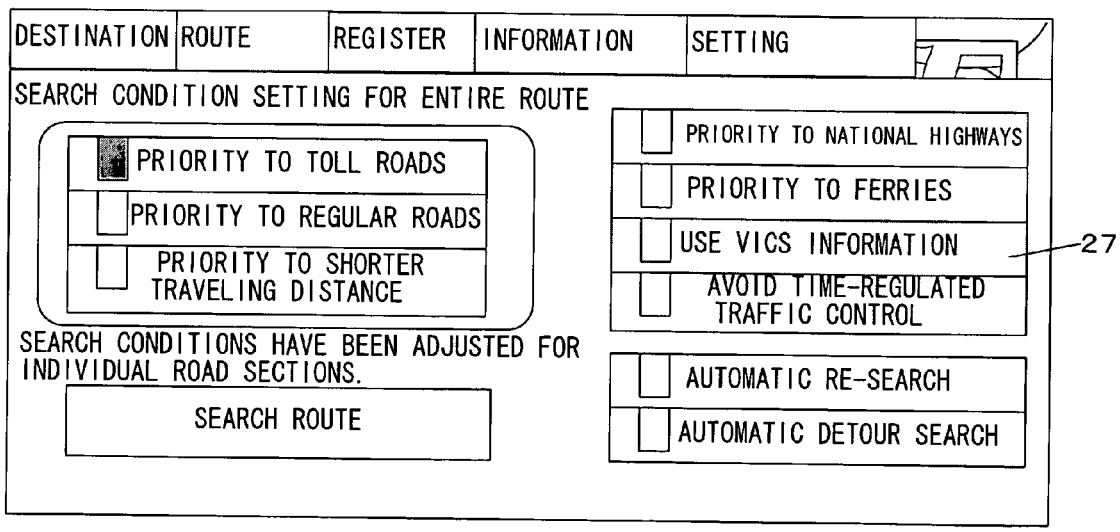
FIG. 10 presents a specific example of an instruction screen that may be brought up on display after the screen shown in FIG. 9.

Next, specific examples of instruction screens which are successively displayed in an order matching the operation procedure for selecting the menu item when the display jumps to the screen in which the menu item having been designated in the search result screen may be selected in the selection menu is explained. For instance, let us assume that the menu item "use VICS information" is searched based upon a keyword entered by the user in the keyword entry screen in FIG. 5 and that this menu item is designated in the search result screen in FIG. 5. Under such circumstances, the instruction screen shown in FIG. 8 is first brought up on display and then, the instruction screens shown in FIGS. 9 and 10 are sequentially displayed. It is desirable to display contents in a manner closely simulating the screen changes resulting from the actual operation by, for instance, sequentially highlighting the menu items from top to bottom.

The instruction screen shown in FIG. 8 indicates the contents of the operation screen (menu screen) initially brought up on display when the menu button is pressed. The instruction screen shown in FIG. 9 indicates the contents of the operation screen brought up on display after "route" is selected in the menu screen corresponding to the instruction screen shown in FIG. 8. The instruction screen shown in FIG. 10 indicates the contents of the operation screen brought up on display after "set search condition" is selected in the menu screen corresponding to the instruction screen shown in FIG. 9. The user is informed of the operation procedure to be performed to select the menu item "use VICS information" as these instruction screens are displayed in sequence.

During the actual operation, operation screens carrying contents identical to those in the instruction screens shown in FIGS. 8 through 10 are displayed in sequence in response to the user operations described above. Then, as an option "use VICS information" indicated by reference numeral 27 is selected in an operation screen corresponding to the instruction screen in FIG. 10, the search condition settings in the navigation system 2 are adjusted so as to execute a route search by using VICS information.

The instruction screens in FIGS. 8 through 10 described above are switched in response to a user operation input. More specifically, as the user presses a fast-forward button (not shown) at the input device 17, the display is switched to the next instruction screen. It is to be noted that a rewind button (not shown) is also included in the input device 17 and as the user presses the rewind button, the display is switched back to the immediately preceding instruction screen. For instance, if the fast-forward button is pressed while the instruction screen in FIG. 9 is up on display, the display is switched to the instruction screen in FIG. 10, but if the rewind button is pressed, the display is switched to the instruction screen in FIG. 8. In addition, when a predetermined length of display change-over time elapses after any one of the instruction screens is brought up on display, the display is switched to the next instruction screen without a user operation input. The length of display change-over time can be adjusted as explained below based upon a user operation record.

The navigation system 2 in the embodiment allows one of a plurality of different lengths of display change-over time to be selected for each of the instruction screens in FIGS. 8 through 10. If the fast-forward button is pressed and the display is switched to the next instruction screen, it judges that the length of time required by the user to read the instruction screen having been fast forwarded (the instruction screen on display prior to the change-over) is less than the current setting for the length of display change-over time and sets the length of display change-over time for the particular instruction screen to a lower setting by one stage. If, on the other hand, the rewind button is pressed and the display is switched to the preceding instruction screen, the navigation system judges that the length of time required by the user to read the rewound instruction screen (the instruction screen brought up on display after the change-over) is greater than the current setting for the length of display change-over time and accordingly sets the length of display change-over time for a particular instruction screen to a higher setting by one stage. The setting for the display change-over time thus selected is stored into the flash memory 40 and takes effect when the instruction screen is displayed next. In short, the display change-over time is set based upon the instruction screen selection record.

For instance, the length of display change-over time may be selected in an increment of 1 sec over a range of 1 to 5 sec and the initial value for the display change-over time for each operation screen may be set to 3 sec. Then, if the fast-forward button is pressed to switch to the instruction screen in FIG. 10 while the instruction screen in FIG. 9 is on display, the display change-over time for the instruction screen in FIG. 9 may be adjusted from the 3 sec, i.e., the initial value, to 2 sec. If the fast-forward button is pressed again while the instruction screen in FIG. 9 is up on display, the display change-over time should be set to 1 sec. In addition, if the rewind button is pressed to switch to the instruction screen in FIG. 8 while the instruction screen in FIG. 9 is on display, the display change-over time for the instruction screen in FIG. 8 may be adjusted from the 3 sec, i.e., the initial value to 4 sec. If the rewind button is pressed again while the instruction screen in FIG. 9 is up on display, the display change-over time should be set to 5 sec. By adjusting the display change-over time for each instruction screen based upon the user screen selection history as described above, and thus factoring in the lengths of time required by the particular user to read the individual instruction screens, as described above, the optimal instruction screen display change-over time can be selected.

It is to be noted that if menu items in an instruction screen the display change-over time of which has been adjusted contains menu items sequentially highlighted from top to bottom by the cursor, the speed with which the cursor moves, too, be adjusted in correspondence to the adjusted display change-over time. In addition, if the length of display change-over time is small, the cursor highlight display may be omitted altogether.

Figure 11:
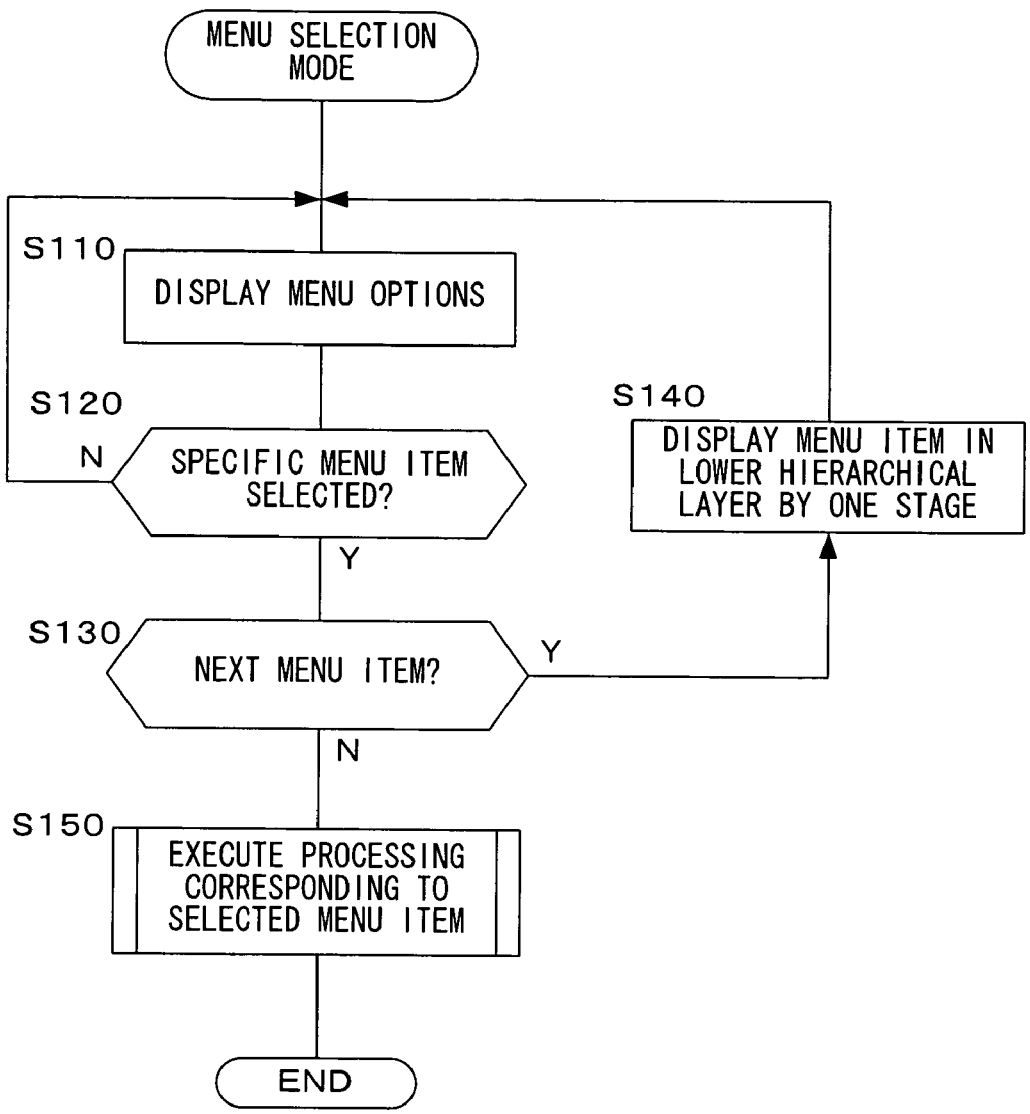
FIG. 11 presents a flowchart of the processing executed in the menu selection mode.
Figure 12:
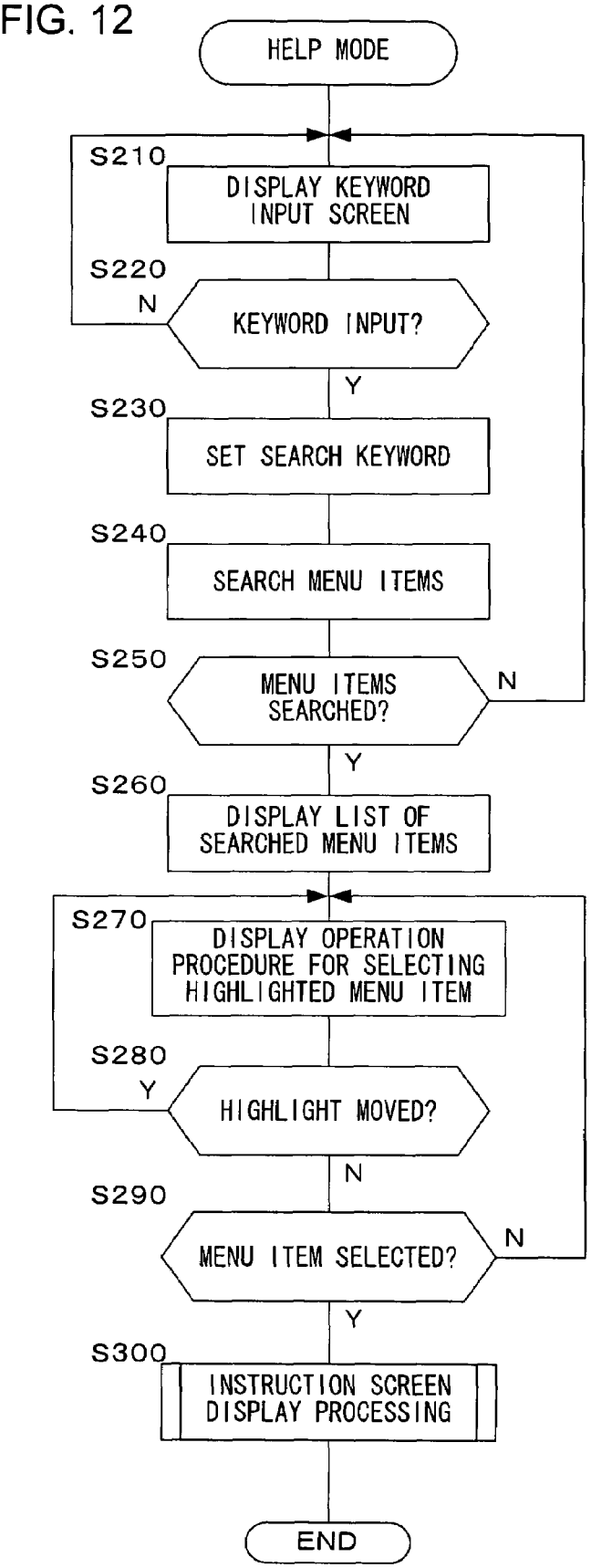
FIG. 12 presents a flowchart of the processing executed in the help mode.

FIGS. 11 and 12 present flowcharts of the processing which is executed by the control circuit 11 in the second embodiment. FIG. 11 presents a flowchart of the processing executed in the menu selection mode, whereas FIG. 12 presents a flowchart of the processing executed in the help mode. An explanation is given first on the processing corresponding to the flowchart in FIG. 11.

In step S110, the operation shifts into the menu selection mode and a menu screen which has same contents of the instruction screen shown in FIG. 8 is brought up at the display monitor 16. The selection menu is thus brought up on display. In step S120, a decision is made as to whether or not the user has selected one of the menu items in the selection menu having been brought up on display in step S110. If it is decided that one of the menu items has been selected, the operation proceeds to the following step S130. If it is decided that no menu item has been selected, the operation returns to step S110 to continuously display the selection menu.

In step S130, a decision is made as to whether or not there are any menu items subordinate to the menu item having been selected in step S120. As explained earlier, the selection menu is organized over a plurality of hierarchical levels and accordingly, if the selected menu item is a menu item in the lowermost level, i.e., if the specific type of processing to be executed by the navigation system 1 is determined in correspondence to the selection of the particular menu item, it is decided that there are no menu items subordinate to the selected menu item. Otherwise, it is decided that there are menu items subordinate to the selected menu item. The operation proceeds to step S140 if it is decided that there are menu items subordinate to the selected menu item, but the operation proceeds to step S150 if it is decided that there are no menu items subordinate to the selected menu item.

In step S140, menu items in the hierarchical level one step lower than the hierarchical level of the menu item having been selected in step S120 are brought up on display at the display monitor 16. The contents of the menu items displayed at this time are determined based upon the results of the menu item selection in step S120 and in conformance to the predetermined hierarchical structure of the selection menu. For instance, if "destination" is selected, menu items in the hierarchical level one step lower than "destination", i.e., "favorite", "input name", "facility", "telephone number", "address" and "previous destination", are brought up on display. Once the processing in step S140 is executed, the operation returns to step S110 and after these menu items are brought up on display in step S110 as the next selection menu, the processing described above is repeated. By repeatedly executing the processing in steps S120 through S140 as described above, a specific menu item in each hierarchical level in the selection menu is selected in response to a user operation.

In step S150, the processing corresponding to the menu item having been determined in step S120 as an ultimate selection is executed. For instance, if the menu item "use VICS information" has been selected in step S120, the setting of search condition is adjusted so as to execute a route search by using the VICS information. It is to be noted that since the subsequent processing can be executed by adopting any of various methods of the known part in correspondence to the processing contents, a specific processing method is not explained. Once the processing in step S150 is executed, the processing in the flowchart presented in FIG. 11 ends. The menu selection mode processing is executed through the flow described above.

Next, the processing executed in the help mode as shown in the flowchart in FIG. 12 is explained. In step S210, the keyword entry screen in FIG. 5 is brought up on display at the display monitor 16. In the following step S220, a decision is made as to whether or not any keyword has been entered through a user operation in the keyword entry screen having been brought up on display in step S210. If the user has pressed down on the search button 23, it is judged that the keyword entry has been completed and, in this case, the operation proceeds to step S230. If, on the other hand, the search button 23 has not been pressed, it is judged that the keyword entry has not been completed yet and the operation returns to step S210 to continue the keyword entry screen display.

In step S230, a search keyword to be used to search for menu items is set based upon the keyword having been entered in step S220. In step S240, menu items related to the search keyword are searched based upon the search keyword having been set in step S230. In step S250, a decision is made as to whether or not at least one menu item related to the search keyword has been searched in step S240. If it is decided that at least one menu item has been searched, the operation proceeds to step S260. Otherwise, i.e., if no menu item has been searched, the operation returns to step S210 to prompt the user to reenter a keyword.

In step S260, the menu items having been searched in step S250 are displayed in a list at the display monitor 16. It is to be noted that one of the menu items in the list on display is highlighted. Thus, a search result screen such as that shown in FIG. 6 is brought up on display at the display monitor 16. In the following step S270, the operation procedure for selecting the highlighted menu item among the menu items in the list having been brought up on display in step S260 is displayed at the display monitor 16 in the form of text information in the balloon display area 25 in FIG. 6. As a result, the user is informed of the operation procedure for selecting the highlighted menu item in the selection menu.

In step S280, a decision is made as to whether or not a different menu item in the list displayed on the screen is now highlighted in response to a user operation. If the highlight display has been switched, the operation returns to step S270 to display the operation procedure for selecting the newly highlighted menu item at the display monitor 16. If, on the other hand, it is decided that the initial menu item is still highlighted, the operation proceeds to the next step S290.

In step S290, a decision is made as to whether or not one of the menu items in the list on display has been selected. For instance, if an OK button included in the input device 17 has been pressed down by the user, it is decided that the highlighted menu item has been selected and the operation proceeds to step S300. If, on the other hand, no menu item has been selected, the operation returns to step S270 to repeatedly execute the processing described above. The selected menu item in step S290 is designated in the following processing.

In step S300, instruction screen display processing is executed to successively display instruction screens such as those shown in FIG. 8 through 10 at the display monitor 16. The instruction screen display processing is executed as explained below in reference to the flowchart presented in FIG. 13.

Figure 13:
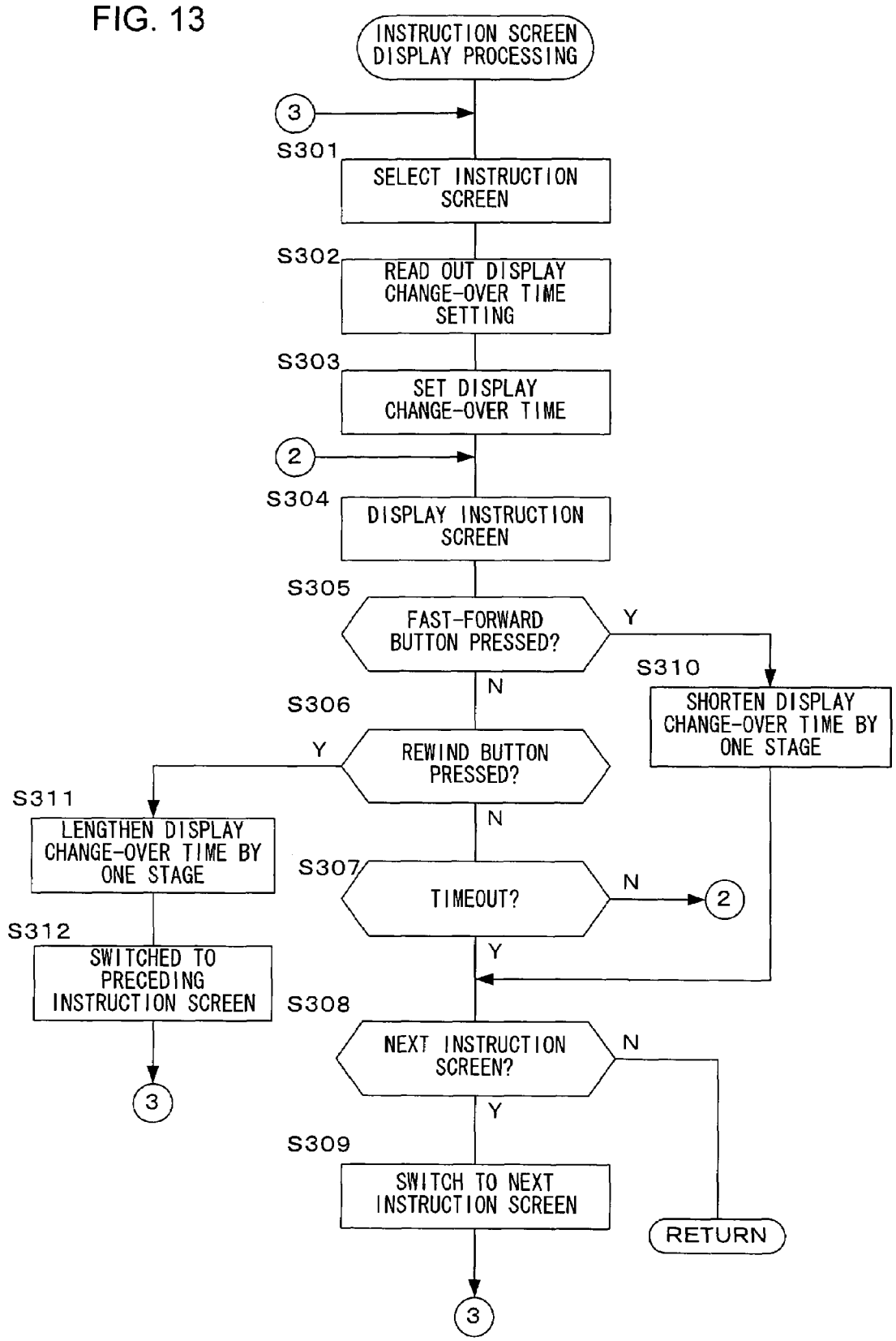
FIG. 13 presents a flowchart of the instruction screen display processing.

In step S301 in FIG. 13, the instruction screen to be brought up on display is selected through the operation procedure executed when selecting from a menu screen the menu item having been selected in step S290 in FIG. 12. Namely, the instruction screen in FIG. 8 is first selected and then the instruction screen in FIG. 9 and the instruction screen in FIG. 10 are selected in this order. In the next step S302, the value indicating the display change-over time setting for the instruction screen having been selected in step S301 is read out from the flash memory 40. In step S303, the display change-over time for the selected instruction screen is set to the value having been read out in step S302.

In step S304, the instruction screen having been selected in step S301 is brought up on display at the display monitor 16. In the following step S305, a decision is made as to whether or not the user has pressed the fast-forward button at the input device 17. If it is decided that the fast-forward button has been pressed, the operation proceeds to step S310, whereas the operation proceeds to step S306 if it is decided that the fast-forward button has not been pressed. In step S306, a decision is made as to whether or not the user has pressed the rewind button at the input device 17. If it is decided that the rewind button has been pressed, the operation proceeds to step S311, whereas the operation proceeds to step S307 if it is decided that the rewind button has not been pressed.

In step S307, a decision is made as to whether or not the display time for the instruction screen has elapsed by comparing the length of time having elapsed after the instruction screen was brought up on display in step S304 and the display change-over time having been set in step, S303. If the length of time having elapsed is equal to or less than the display change-over time having been set, the operation returns to step S304 to keep the instruction screen up on display. Once the length of elapsed time exceeds the display change-over time, the operation proceeds to step S308.

In step S308, a decision is made as to whether or not any instruction screen is to be brought up on display next, i.e., whether or not any instruction screen is to be brought up on display after the current instruction screen having been brought up on display in step S304. If there is another instruction screen to be displayed, the operation proceeds to step S309 in which the display is switched to the next instruction screen and then the operation returns to step S301. Under these circumstances, the instruction screen to which the display has been switched is selected in step S301, and subsequently, the processing described above is repeatedly executed. Namely, if the instruction screen in FIG. 8 has been previously on display, the instruction screen in FIG. 9 is selected in step S301 and then the processing in step S302 and beyond is executed. Likewise, if the instruction screen in FIG. 9 has been previously on display, the instruction screen in FIG. 10 is selected in step S301 and then the processing in step S302 and beyond is executed.

If, on the other hand, it is decided in step S309 that there is no more instruction screen to be brought up on display, the processing in the flowchart presented in FIG. 13 ends. Namely, if the instruction screen in FIG. 10 is currently on display, there is no more instruction screen to bring up on display and accordingly, the processing in the flowchart presented in FIG. 13 ends. Once the instruction screen display processing in step S300 in FIG. 12 is executed as described above, the processing in the flowchart presented in FIG. 12, ends. The help mode is thus executed.

It is to be noted that if the operation proceeds from step S305 to step S310, the display change-over time setting for the selected instruction screen is shortened by one stage in step S310. This setting record is stored into the flash memory 40 so that the new display change-over time setting shorter by one stage is used subsequently. Once the processing in step S310 is executed as described above, the operation proceeds to step S308. It is to be noted that if the current display change-over time setting is at the shortest possible setting, the operation directly proceeds to step S308 without executing step S310.

If, on the other hand, the operation proceeds from step S306 to step S311, the display change-over time setting for the selected instruction screen is lengthened by one stage in step S311. This setting record is stored into the flash memory 40 so that the new display change-over time setting longer by one stage is used subsequently. Once the processing in step S311 is executed as described above, the operation proceeds to the next step, S312. It is to be noted that if the current display change-over time setting is at the longest possible setting, the operation directly proceeds to step S312 without executing step S311.

In step S312, the display is switched to the immediately preceding instruction screen. Once the processing in step S312 is executed, the operation returns to step S301 to select the instruction screen to which the display has been switched and subsequently, the processing described above is repeatedly executed. Namely, if the instruction screen in FIG. 9 has been previously on display, the instruction screen in FIG. 8 is selected in step S301 and then the processing in step S302 and beyond is executed. Likewise, if the instruction screen in FIG. 10 has been previously on display, the instruction screen in FIG. 9 is selected in step S301 and then the processing in step S302 and beyond is executed. It is to be noted that if the instruction screen in FIG. 8 has been on display, there is no preceding instruction screen and accordingly, the instruction screen in FIG. 8 may be selected again in step S301 and the processing in step S302 and beyond then may be executed.

The following advantages are achieved in the second embodiment described above.

(1) In the help mode, an instruction screen is brought up on display at the display monitor 16 in conformance to a specific operation procedure (step S304), and when the length of time matching the display change-over time setting elapses (step S307), the display is switched to the next instruction screen (step S309). In addition, as the fast-forward button or the rewind button at the input device 17 is pressed (step S305 or S306), either the preceding instruction screen or the succeeding instruction screen can be selected irrespective of the length of display change-over time (step S309 or S312). Then, based upon the instruction screen selection record, the display change-over time is adjusted (step S310 or S311). As a result, the screen display change-over time can be adjusted by factoring in the length of time required by the particular user to read the information in the screen on display, as in the first embodiment.

(2) If the fast-forward button is pressed (step S305) to select the next instruction screen while a given instruction screen is up on display at the display monitor 16, the display change-over time is adjusted to a setting lower by one stage in step S310. This value setting is read out in step S302, and the display change-over time is set accordingly in step S303. Namely, if the fast-forward button has been pressed to select the next instruction screen while a given instruction screen was up on display in the past, the display change-over time for the particular instruction screen is shortened in step S303. As a result, the screen display change-over timing is optimized.

(3) If the rewind button is pressed (step S306) to select the preceding instruction screen while a given instruction screen is up on display at the display monitor 16, the display change-over time is adjusted to a setting longer by one stage in step S311. This value setting is read out in step S302, and the display change-over time is set accordingly in step S303. Namely, if the rewind button has been pressed to select the preceding instruction screen while a given instruction screen was up on display in the past, the display change-over time for the preceding instruction screen is set longer in step S303. As a result, the screen display change-over timing is optimized.

It is to be noted that while the display change-over timing is adjusted by the user pressing the fast-forward button or the rewind button in the second embodiment described above, the display change-over timing may be adjusted through a combination of user operation on the fast-forward/rewind buttons and the volume of information contained in the screen as described earlier in reference to the first embodiment. For instance, the display change-over time may be adjusted in correspondence to the number of characters or the number of menu items contained in the instruction screen up on display.

While an explanation is given above in reference to the embodiments on instruction screens brought up on display in the help mode, VICS information provided as an interrupt display and instruction, the present invention may also be adopted in screen display other than those explained in reference to the embodiments, as long as the display contents are switched as a predetermined length of display time elapses. For instance, the present invention may be adopted in a warning screen brought up on display over a predetermined length of time when a recommended route is set, a confirmation screen brought up on display over a predetermined length of time when a given location is registered or a name is altered. In such a case, the display time length can be adjusted based upon the volume of information such as the number of characters contained in the warning screen or the confirmation screen or based upon a screen selection record indicating a change-over from the warning screen or the confirmation screen to another screen effected in response to a user operation input.

In the embodiments described above, the display control unit, the time control unit and the display selection unit are realized through processing executed by the control circuit 11. More specifically, the display control unit is achieved through the processing executed in steps S50, S60 and S70 and the time control unit is realized through the processing executed in steps S30, S31, S40 and S41 in the first embodiment. In addition, the display control unit is realized through the processing executed in steps S304, S307 and S309, the display selection unit is realized through the processing executed in steps S305, S306, S309 and S312 and the time control unit is realized through the processing executed in steps S302, S303, S305, S306, S310 and S311 in the second embodiment. However, they simply represent examples and the present invention may be interpreted without being limited in any way whatsoever to the correspondence between the contents of the embodiments and the contents carried in the scope of claims.

Figure 14:
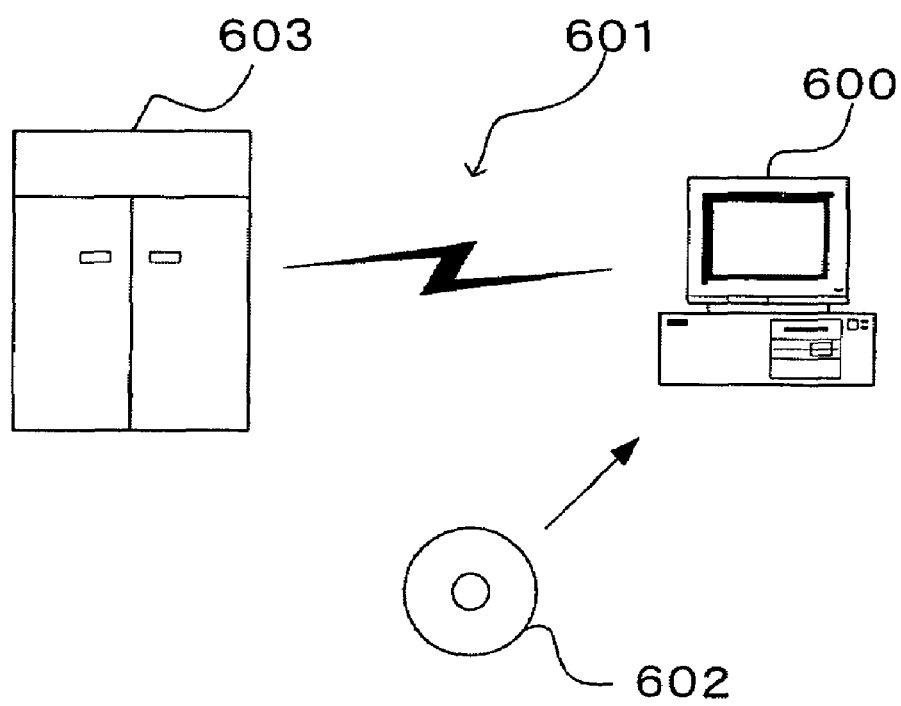
FIG. 14 shows how the present invention may be adopted in a personal computer.

It is to be noted that the present invention may be adopted in a personal computer or the like by providing a program related to the control described above in a recording medium such as a CD-ROM or through an electrical communication network such as the Internet. FIG. 14 shows a configuration that may be adopted in such applications. A personal computer 600 receives the program via a CD-ROM 602. The personal computer 600 also has a function of achieving a connection with a communication line 601 to receive the program provided by a server 603. The communication line 601 may be a communication network for Internet communication or personal computer communication, or it may be a dedicated communication line. The server 603 transmits the program to the personal computer 600 via the communication line 601. In other words, the program, converted to a data signal on a carrier wave, is transmitted via the communication line 601. Thus, the program can be distributed as a computer-readable computer program product adopting any of various modes including a recording medium and a carrier wave.

The embodiments and variations described above are simply provided as examples and components other than those in the embodiments may be used as long as the features characterizing the present invention are not compromised.

What is claimed is:

1. An on-vehicle information terminal, comprising:
a display control unit that displays a first screen at a display monitor and switches from the first screen to a second screen when a predetermined length of display change-over time elapses after the first screen starts to be displayed; and
a time control unit that adjusts the length of display change-over time based upon at least one of a volume of information contained in the first screen and a screen selection record indicating past selections of the first screen or the second screen by a user.

2. An on-vehicle information terminal according to claim 1, wherein:
the volume of information is a number of characters contained in the first screen.

3. An on-vehicle information terminal according to claim 2, further comprising:
a reception unit that receives road traffic information transmitted from an external source, wherein:
the display control unit displays as the first screen a screen containing a text image presenting the contents of the road traffic information received by the reception unit; and
the time control unit adjusts the length of display time based upon the number of characters in the text image contained in the first screen.

4. An on-vehicle information terminal according to claim 1, wherein:
the volume of information is the volume of traffic jam information contained in the first screen.

5. An on-vehicle information terminal according to claim 4, further comprising:
a reception unit that receives road traffic information transmitted from an external source, wherein:
the display control unit displays as the first screen a screen containing a simplified graphic image presenting the contents of the road traffic information received by the reception unit; and
the time control unit adjusts the length of display time based upon a number of congested areas in the simplified graphic image contained in the first screen.

6. An on-vehicle information terminal according to claim 1, further comprising:
an operation unit that allows the user to select either the first screen or the second screen; and
a display selection unit that displays at the display monitor either the first screen or the second screen selected by the user via the operation unit irrespective of the length of display change-over time, wherein:
the time control unit adjusts the length of display change-over time based upon a screen selection record indicating past screen selections by the user effected via the operation unit.

7. An on-vehicle information terminal according to claim 1, wherein:
the time control unit reduces the length of display change-over time if the screen selection record indicates that the user previously selected the second screen while the first screen was up on display at the display monitor.

8. An on-vehicle information terminal according to claim 1, wherein:
the time control unit increases the length of display change-over time if the screen selection record indicates that the user previously selected the first screen while the second screen was up on display at the display monitor.

9. A method for controlling an on-vehicle information terminal, comprising:
displaying a first screen at a display monitor;
setting a length of display change-over time based upon at least one of a volume of information contained in the first screen and a screen selection record indicating past selections of the first screen or a second screen by a user; and
switching over from the first screen to the second screen when the length of display change-over time having been set elapses after the first screen starts to be displayed.

10. A method for controlling an on-vehicle information terminal according to claim 9, further comprising:
allowing the user to select either the first screen or the second screen;

displaying at the display monitor either the first screen or the second screen selected by the user irrespective of the length of display change-over time; and adjusting the length of display change-over time having been set based upon the record indicating past selections of the first screen or the second screen by the user.

11. A program product to be executed by a computer in an on-vehicle information terminal, enabling the computer to execute:

a processing step for displaying a first screen at the display monitor;

a processing step for setting a length of display change-over time based upon at least one of a volume of information contained in the first screen and a screen selection record indicating past selections of the first screen or the second screen by a user; and a processing step for switching over the first screen to a second screen when the length of display change-over time having been set elapses after the first screen starts to be displayed.

12. A program product according to claim 11, further enabling the computer to execute:

a processing step for allowing the user to select either the first screen or the second screen;

a processing step for displaying at the display monitor either the first screen or the second screen selected by the user regardless of the length of display change-over time; and a processing step for adjusting the length of display change-over time having been set based upon the record indicating past selections of the first screen or the second screen by the user.

* * * * *